(12) United States Patent
Moody et al.

(10) Patent No.: US 9,719,357 B2
(45) Date of Patent: Aug. 1, 2017

(54) TRENCHED COOLING HOLE ARRANGEMENT FOR A CERAMIC MATRIX COMPOSITE VANE

(71) Applicants: Rolls-Royce North American Technologies, Inc., Indianapolis, IN (US); Rolls-Royce Corporation, Indianapolis, IN (US)

(72) Inventors: Jack K. Moody, Avon, IN (US); Richard C. Uskert, Timonium, MD (US); Adam L. Chamberlain, Mooresville, IN (US); David J. Thomas, Brownsburg, IN (US)

(73) Assignees: Rolls-Royce Corporation, Indianapolis, IN (US); Rolls-Royce North American Technologies, Inc., Indianpolis, IN (US)

( * ) Notice: Subject to any disclaimer, the term of this patent is extended or adjusted under 35 U.S.C. 154(b) by 741 days.

(21) Appl. No.: 14/140,963

(22) Filed: Dec. 26, 2013

(65) Prior Publication Data

US 2014/0271131 A1    Sep. 18, 2014

Related U.S. Application Data

(60) Provisional application No. 61/780,933, filed on Mar. 13, 2013.

(51) Int. Cl.
*F01D 5/18* (2006.01)

(52) U.S. Cl.
CPC ........ *F01D 5/186* (2013.01); *F05D 2240/122* (2013.01); *F05D 2240/304* (2013.01); *F05D 2260/202* (2013.01); *Y10T 29/49229* (2015.01)

(58) Field of Classification Search
CPC .......... F01D 5/186; F01D 5/182; F01D 5/183; F01D 5/187; F05D 2240/304; F05D 2240/122; F05D 2260/202
See application file for complete search history.

(56) References Cited

U.S. PATENT DOCUMENTS

| 4,762,464 A | 8/1988 | Vertz et al. |
| 5,243,759 A * | 9/1993 | Brown ...................... B22C 9/10 164/122.1 |

(Continued)

FOREIGN PATENT DOCUMENTS

| EP | 0520714 A1 | 12/1992 |
| EP | 0785339 A1 | 7/1997 |

(Continued)

OTHER PUBLICATIONS

Letterbox Trailing Edge Heat Transfer: Effects of Blowing Rate, Reynolds Number, and External Turbulence on Heat Transfer and Film Cooling Effectiveness; N. J. Fiala, I. Jaswal, and F.E. Arnes, ASME Journal of Turbomachinery vol. 132, 011017 (2010), DOI: 10.1115/1.3106703.

(Continued)

*Primary Examiner* — Craig Kim
*Assistant Examiner* — Eldon Brockman
(74) *Attorney, Agent, or Firm* — Barnes & Thornburg LLP

(57) ABSTRACT

One aspect of the present application provides an apparatus comprising a shape operable as a gas turbine engine component, an internal cavity within the shape including a radius, a trench on an external surface of the shape including a rear face tangential to an arc centered on the radius of the internal cavity, and a cooling hole extending from the internal cavity and exiting to the trench through the rear face of the trench wherein a cooling fluid introduced to the internal cavity flows through the cooling hole and into the trench during operation of the gas turbine engine component.

18 Claims, 5 Drawing Sheets

(56) References Cited

U.S. PATENT DOCUMENTS

| | | | |
|---|---|---|---|
| 5,498,133 A | 3/1996 | Lee | |
| 6,383,602 B1 | 5/2002 | Fric et al. | |
| 6,551,062 B2* | 4/2003 | Leeke | F01D 5/186 |
| | | | 415/115 |
| 6,565,317 B2 | 5/2003 | Beeck et al. | |
| 6,609,891 B2* | 8/2003 | Leeke | F01D 5/186 |
| | | | 415/115 |
| 6,715,988 B2* | 4/2004 | Leeke | F01D 5/186 |
| | | | 415/115 |
| 7,246,992 B2 | 7/2007 | Lee | |
| 7,246,999 B2* | 7/2007 | Manning | F01D 5/186 |
| | | | 415/115 |
| 7,270,514 B2 | 9/2007 | Lee | |
| 7,553,534 B2 | 6/2009 | Bunker | |
| 7,584,538 B2 | 9/2009 | Lee | |
| 7,591,070 B2 | 9/2009 | Lee | |
| 7,766,617 B1 | 8/2010 | Liang | |
| 8,591,191 B1* | 11/2013 | Liang | F01D 5/186 |
| | | | 29/889.7 |
| 8,770,920 B2* | 7/2014 | Naik | F01D 5/187 |
| | | | 415/115 |
| 2003/0044275 A1* | 3/2003 | Leeke | F01D 5/186 |
| | | | 416/79 |
| 2003/0044279 A1* | 3/2003 | Leeke | F01D 5/186 |
| | | | 416/97 R |
| 2003/0059577 A1* | 3/2003 | Morrison | B32B 3/18 |
| | | | 428/166 |
| 2006/0073017 A1* | 4/2006 | Manning | F01D 5/186 |
| | | | 416/97 R |
| 2007/0122282 A1* | 5/2007 | Deschamps | F01D 5/187 |
| | | | 416/97 R |
| 2008/0095622 A1 | 4/2008 | Naik et al. | |
| 2010/0040478 A1 | 2/2010 | Abdel-Messeh et al. | |
| 2011/0097188 A1 | 4/2011 | Bunker | |
| 2013/0017064 A1* | 1/2013 | Naik | F01D 5/187 |
| | | | 415/115 |
| 2013/0302178 A1* | 11/2013 | Bergholz, Jr. | F01D 5/187 |
| | | | 416/97 R |

FOREIGN PATENT DOCUMENTS

| | | |
|---|---|---|
| EP | 924384 A2 | 6/1999 |
| EP | 1267039 A1 | 12/2002 |
| EP | 1555390 A1 | 7/2005 |
| EP | 1662090 A1 | 5/2006 |
| EP | 2500548 A1 | 9/2012 |
| GB | 2257479 A | 1/1993 |

OTHER PUBLICATIONS

International Search Report and Written Opinion, International Application No. PCT/US2013/077816, Oct. 29, 2014, 11 pages.

\* cited by examiner

TRENCHED COOLING HOLE ARRANGEMENT FOR A CERAMIC MATRIX COMPOSITE VANE

CROSS REFERENCE TO RELATED APPLICATIONS

This application claims priority to and the benefit of U.S. Provisional Patent Application No. 61/780,933, filed 13 Mar. 2013, the disclosure of which is now expressly incorporated herein by reference.

TECHNICAL FIELD

The present invention generally relates to cooling arrangements for components in a high temperature environment, and more particularly, but not exclusively, to cooling arrangements having trenched cooling holes for components having an airfoil shape in gas turbine engines.

BACKGROUND

Present approaches to cooling arrangements for some components that operate in a high temperature environment such as those in gas turbine engines suffer from a variety of drawbacks, limitations, disadvantages and problems including those respecting gas path flow disruption and others. Though some airfoils have trailing edge cooling features that provide an effective cooling for certain applications, there are drawbacks to these configurations due to material limitations. Therefore, there is a need for the unique and inventive cooling arrangement apparatuses, systems and methods disclosed herein.

SUMMARY

One embodiment of the present invention is a unique cooling arrangement having trenched cooling holes on the surface of high temperature components such as those on gas turbine engines. Other embodiments include apparatuses, systems, devices, hardware, methods, and combinations for cooling arrangements structured for composite gas turbine engine components. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
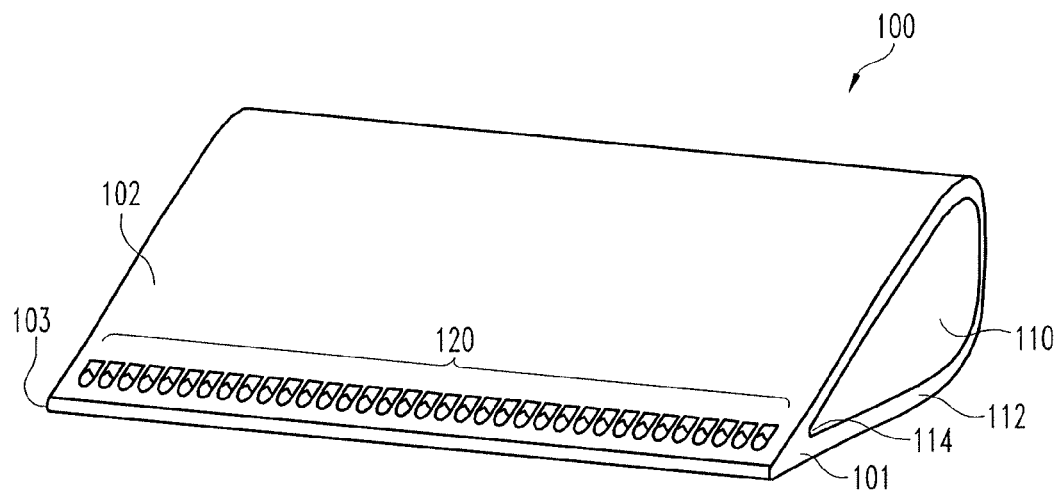
FIG. 1 is a perspective view of a portion of one embodiment of an airfoil shaped component.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, an embodiment of a portion of a component exposed to high temperature operating environments such as those found in gas turbine engines is illustrated. The component can be cooled by a fluid received into an internal cavity and discharged through a defined exit pathway. It should be understood that while "gas turbine engine component" is used throughout this disclosure that the teachings herein can apply to any airfoil shaped component in high temperature environments such as, for example, rocket engines and the like. The portion of the gas turbine engine component of FIG. 1 is shown including a shape 100 having an internal cavity 110. The gas turbine engine component can represent a variety of shapes within a gas turbine engine including, but not limited to, pivoting or static vanes, blade tracks, end walls, and rotating airfoils such as blades. In specific embodiments, the shape 100 can be applied to elongated component features such as those present on turbine airfoil shapes including blades and vanes, for example.

In one non-limiting embodiment, the shape can be an airfoil component structured to have an external flow surface and a trailing edge portion. The airfoil component can be further structured for exposure to a gas flow path of the gas turbine engine. An external gas of the gas flow path can flow along the external flow surface of the airfoil component during the operation of the gas turbine engine.

The shape 100 of the gas turbine engine component can include a composite structure, and in one non-limiting form is made with a ceramic matrix composite (CMC). Numerous techniques are known for producing ceramic matrix composites, many of which rely upon multi-step processes. Such steps can include coating of fibers, fixation and lay-up of a preform, introduction of matrix material, densification, final firing and post-fabrication, among potential other steps and various combinations. Fibers or plies in certain embodiments can be ceramic materials such as but not limited to carbon, silicon carbides, alumina, and mullite. The fibers can be formed as fabrics, filament windings, braids, and knots, for example. Fibers can also be coated with various materials.

Several methods can be used for matrix material introduction or infiltration. A few of those methods can include vapor deposition (chemical or physical), pyrolysis of a pre-ceramic polymer, chemical reaction and sintering. The introduction process used can depend on the materials selected for the fibers and the matrix. A combination of materials and processes can be applied.

A partially developed shape 100 can have features formed into the various sections of the shape. Formation processes for such features can include laser drilling, ultrasonic machining and other such methods. Then the shape can be processed to its final form using steps appropriate for the material type. When the shape 100 includes a ceramic material such as with various embodiments described above, final processing can include multiple steps depending on what is required to finalize the ceramic, whether it be firing to sinter ceramic particles, densifying the article, or otherwise. In another example, features can be formed into a fully developed or densified shape with post-fabrication formation processes for material removal such as laser drilling, ultrasonic machining and the like.

In alternative embodiments, the composite structure can include other materials such as organic and metallic matrixes. Further, in various other embodiments, the shape 100 can include a metallic structure and can further include an alloy such as, for example, a superalloy. Feature formation processes for metallic materials can include the methods discussed above.

Figure 2:
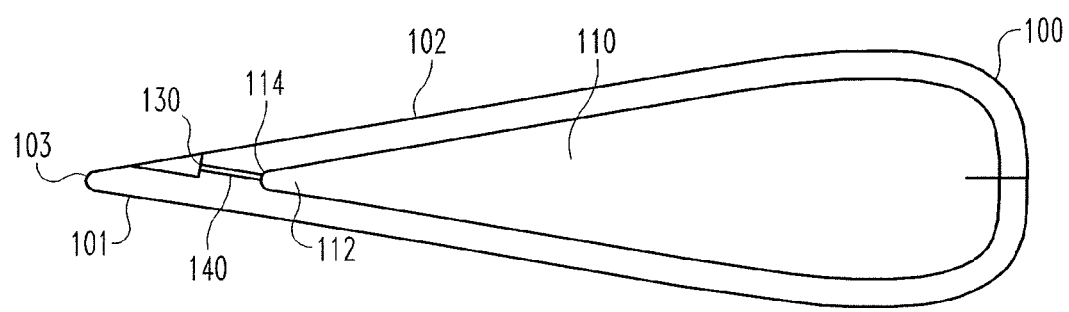
FIG. 2 is a side cross sectional view of a portion of one embodiment of an airfoil shaped component.

The shape 100 of FIG. 2 is shown to have a trailing edge portion 101 where an external flow surface 102 ends at the trailing edge 103 of the shape 100. The external flow surface 102 can be part of a top or bottom sidewall of the shape 100. In other variations, the external flow surface 102 is part of a pressure or suction sidewall which will be appreciated can take a variety of forms including, but not limited to, concave and convex surfaces.

Further, the internal cavity 110 can be disposed within the shape 100 and have various configurations. The configuration of the internal cavity 110 in the embodiment shown in FIG. 2 follows the profile of the shape 100. For some embodiments, the internal cavity 110 can include substantially all or only a portion of the interior space of the shape 100. In this example, the internal cavity 110 is capable of supplying a cooling fluid to various portions of the shape 100 where examples of such portions are the trailing edge portion 101 and the cooling pathways 120 shown in FIG. 1.

In relation to the type, shape, or configuration of the internal cavity 110, the internal cavity can include a rear portion having a portion turned between a top and bottom of the cavity. As used herein, "top" and "bottom" are for convenience of reference, and are not intended to be limiting. The turned portion can include a constant radius or have an instantaneous radius of curvature that varies as the turned portion progresses from the top to the bottom of the internal cavity.

For the embodiment of FIG. 2, the internal cavity 110 is a portion of the interior space of the shape 100 having an aft-most region 112 proximate the trailing edge portion 101. The aft-most region can have a curved perimeter or radius 114. The curved perimeter can be described with a radius of curvature which is the measure of a radius of a circular arc which best approximates the curvature at that point on the perimeter. The radius of curvature and thereby a radius of the aft-most region can vary along the points of the perimeter or remain constant. The curvature can vary for some points and remain constant for others. The curvature at a specific point on a perimeter allows the calculation of an instantaneous radius of curvature at the specific point.

Figure 3:
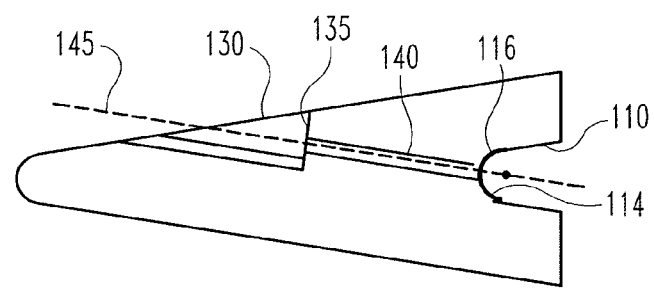
FIG. 3 is a side cross sectional view of an end portion of another embodiment of an airfoil shaped component.
Figure 3A:
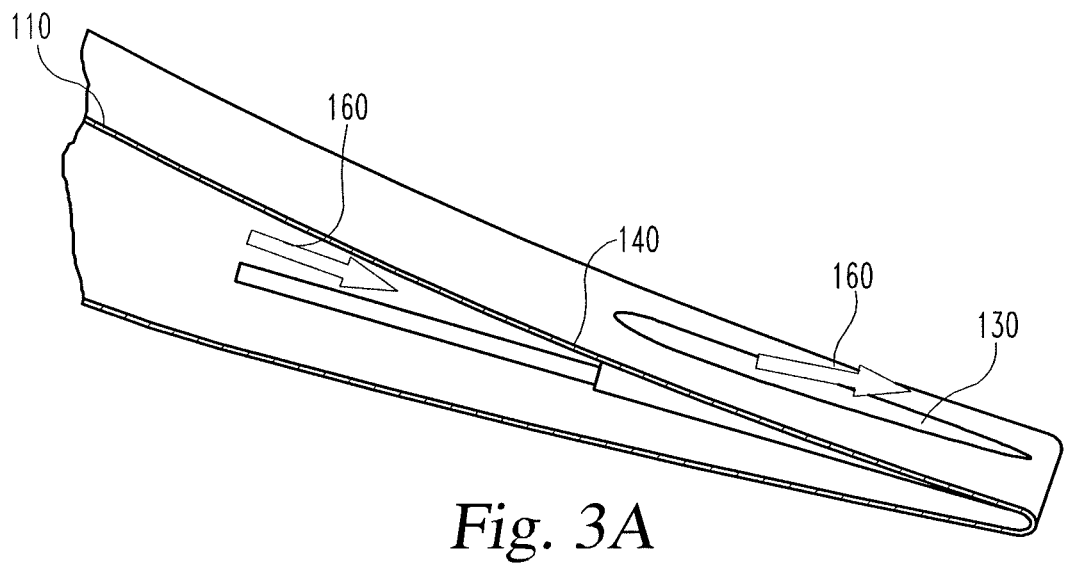
FIG. 3A is a perspective cut away view of an embodiment of an end portion of an airfoil shaped component.

A portion of the shape 100 of FIG. 2 is shown in FIG. 3 with a cooling hole 140 that extends between the internal cavity 110 and a trench 130 that includes a face 135 through which the cooling hole 140 exits. The cooling hole 140 of the cooling pathway extends from the internal cavity 110 exiting to the trench 130 through the rear face 135 and is structured to supply a cooling fluid introduced to the internal cavity 110. A cooling fluid 160 shown in FIG. 3A is introduced to the internal cavity 110 and flows through the cooling hole 140 and into the trench 130 during operation of the gas turbine engine.

The cooling hole 140 can have variable geometry along a cooling hole centerline 145. As illustrated in FIGS. 4A-4E, the cooling hole geometry can include, but is not limited to, perimeter points non-parallel to a centerline 140A, converging perimeters 140B, diverging perimeters 140C, and a centerline askew 140D, 140E from a centerline of other features of the shape 100 to name a few. The cooling hole can have various cross-sections such as circular, oval, oblong, quadratic, and irregular to name a few.

Figure 5:
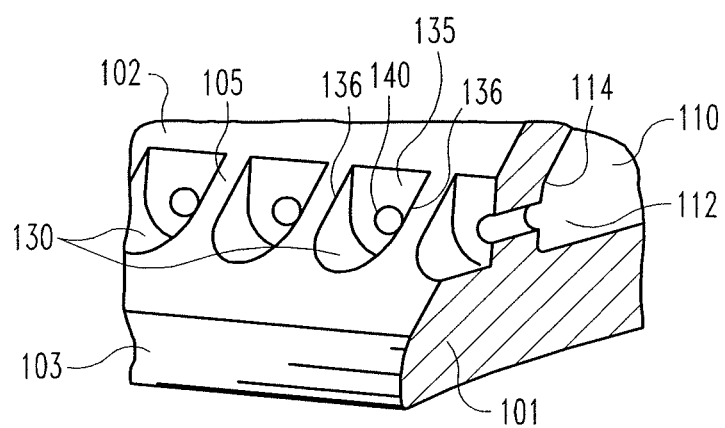
FIG. 5 is a perspective view of a partial cut away end portion of one embodiment of an airfoil shaped component.
Figure 4A:
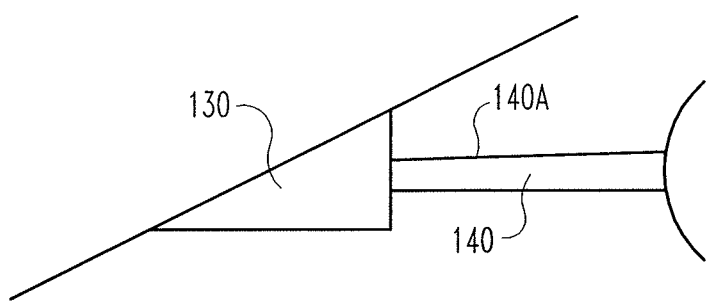
FIGS. 4A-4E are schematic drawings of various embodiments of an end portion of an airfoil shaped component.
Figure 4B:
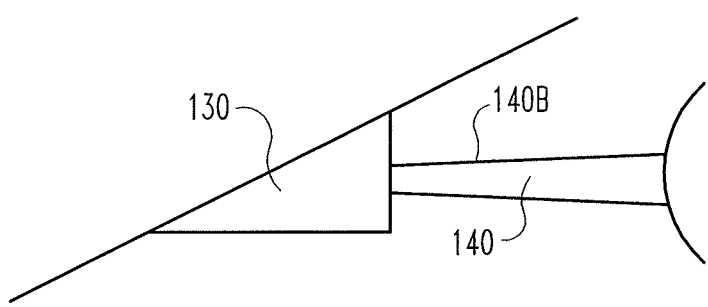
Figure 4C:
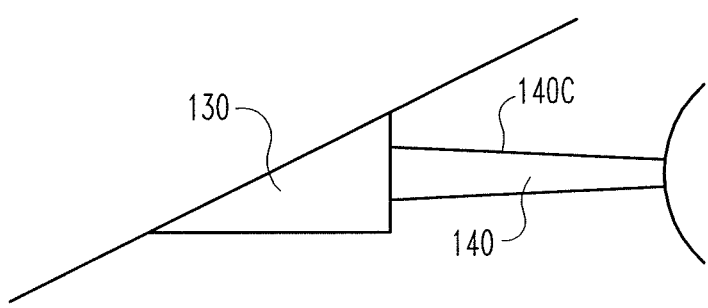
Figure 4D:
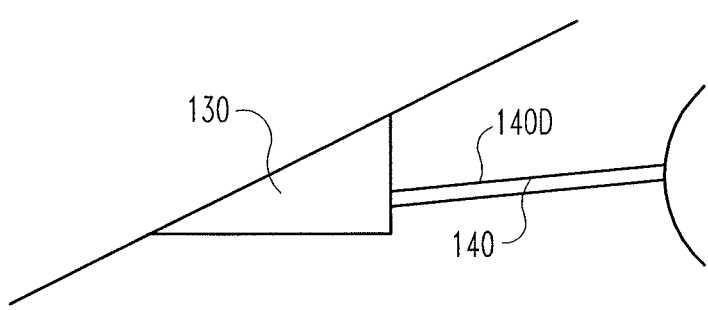
Figure 4E:
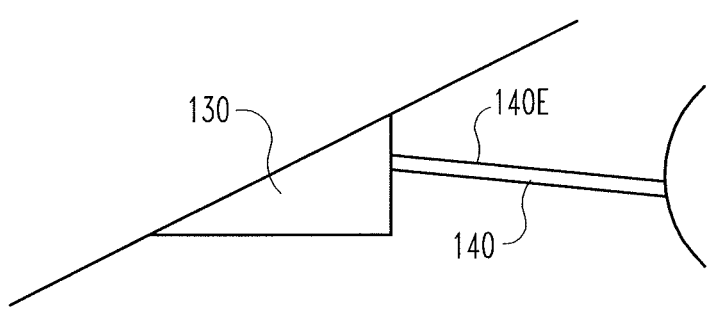

An embodiment of FIG. 5 shows a cooling hole 140 which extends from the aft-most portion 112 of the internal cavity 110 to the trench 130. The trench 130 forms an opening into the gas flow path located in a trailing edge portion 101 of the shape 100 and includes opposing lateral walls 136. In one embodiment, an aft-most part of the trailing edge 103 is aft of the end of the trench 130. The bottom of the trench 130 can have a profile with a cross-section that is circular, quadratic, elongated, oblong, tear drop, and the like. The lateral walls 136 of the trench 130 can have a curvature common to both walls. In another embodiment, the lateral walls 136 can have sloped or non-vertical sides. In the alternate, the lateral walls 136 can be oblique. A lateral wall 136 at an upstream end of the trench 130 can be planar in part and toward a downstream end the wall 136 can merge into the bottom of the trench 130 given that the wall 136 includes the outer shape.

The lateral walls 136 need not be structured the same or be mirror opposites of one another. For example, a trench can have a degree of perpendicularity with a plane of the shape relative to each coordinate. Varying the degree of perpendicularity for the different coordinates can affect the geometry of the lateral walls. A trench which is essentially perpendicular could have similarly shaped lateral walls. A trench with a lesser degree of perpendicularity can result in dissimilar lateral walls. Further embodiments can include mixed geometry where one section of the lateral wall 136 can be linear and another section can be curved.

Illustrated in the embodiment shown in FIG. 5 is a portion 105 of the external surface 102 between the trenches 130. The dimensions of the portion 105 can vary with the dimensions of the trench 130 and the relative positioning of the trench 130 to the external surface 102. The portion 105 can be considered co-planar to the external surface 102 in one embodiment or to other topographical features in other embodiments. Also in the embodiment shown in FIG. 5, a trench rear wall 135 can extend on either side of the hole to intersect both of the opposing lateral walls 136. The opposing lateral walls 136 can extend downstream away from the trench rear wall 135.

Figure 6A:
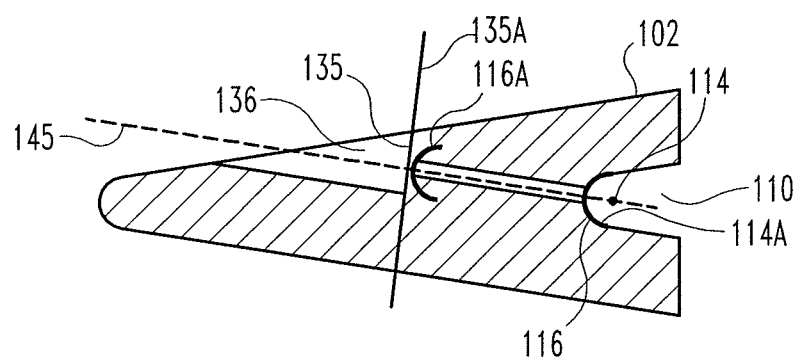
FIGS. 6A-6B are cross sectional views of end portions of embodiments of airfoil shaped components.

The rear face 135 or trench rear wall, as shown in more detail in FIG. 6A, can be disposed at an angle to the external flow surface 102 of the shape 100. In the embodiment shown, the rear face 135 is tangential to an arc 116 centered on a radius 114 of an internal cavity 110. A tangent arc 116A is displaced along the centerline 145 of the arc 116. A tangential plane 135A is tangential to tangent arc 116A. The rear face 135 is tangential and essentially parallel to the tangential plane 135A and therefore, by translation, the rear face 135 is tangential to the arc 116 centered on the radius 114 of the internal cavity 110. Alternatively for the embodiment shown in FIG. 6A, the rear face 135 is tangential to an arc 116A centered on a turned surface at the radius of curvature 114A of the internal cavity 110. In another embodiment, the rear face can be tangential to an arc askew from the arc centered on the radius of the internal cavity while still creating a pocket within the shape. The rear face 135 can extend as a plane to both side walls 136.

Figure 6B:
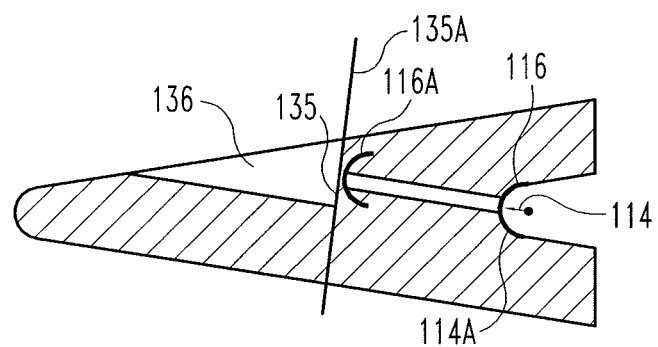

In another embodiment, the cooling hole 140 can be centered on a centerline 145 of an arc 116 of the radius 114 at the aft-most portion 112 of the internal cavity 110 extending from the internal cavity 110 to the trench 130. In some forms, the rear face 135 can include a planar portion disposed about the cooling hole 140 and also be part of a curved surface such as a surface that is indented and a faceted face that extends to the side walls 136 as illustrated in FIG. 6B.

Figure 7A:
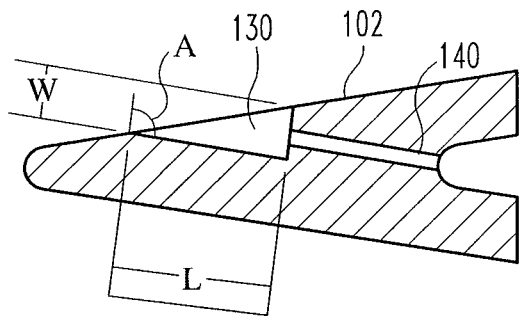
FIGS. 7A-7B are cross sectional views of end portions of embodiments of airfoil shaped components.
Figure 7B:
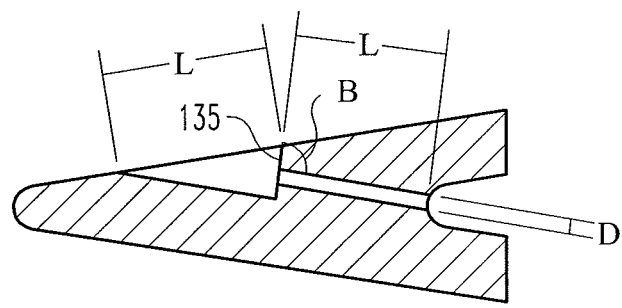
Figure 7C:
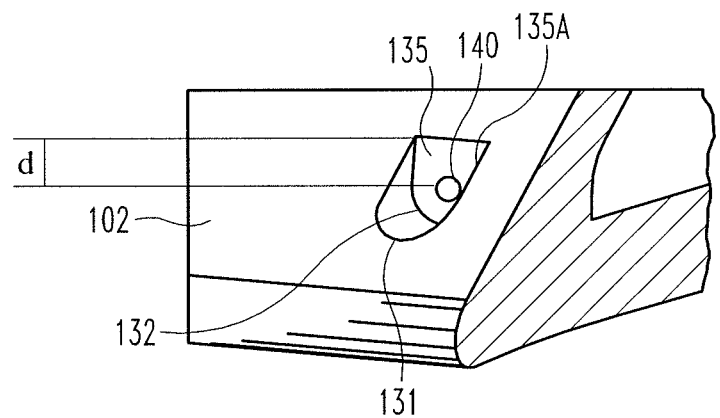
FIG. 7C is a perspective view of another embodiment of an end portion of an airfoil shaped component.

The geometry of the trench 130 and the cooling hole 140 can be structured to retard mixing of external gases and a cooling fluid flowing through the cooling hole 140 and the trench wall 135 to the trench 130. The shaping of the trench can provide a stronger cooling fluid film within the trench. With reference to FIGS. 7A, 7B and 7C, the trench can have a variety of dimensions including width W, length L, lateral wall form or radius 131, rear wall radius 132, angle of incidence A to the external surface 102, and the like. Likewise, the cooling hole can have a variety of dimensions including diameter D, length L, angle of incidence B to the rear wall 135, and the like. Other dimensions in other embodiments can include a distance d from the cooling hole centerline to an intersection of the external surface and the rear wall or the lateral walls and the rear wall. In one example, the exit for the cooling hole 140 through the rear face 135 is internal to an outer periphery of the rear face 135. It is contemplated that these dimensions can vary from one point to another in a single embodiment. The trench and cooling hole can be structured with these dimensions to provide an increase in the adiabatic effectiveness at the trailing edge as well as reduce coolant flow requirements and lessen induced thermal gradients without sacrificing structural integrity.

A gas turbine engine component with an internal cavity and a cooling pathway can be constructed by shaping a trench on an external surface proximate a trailing edge of the component including opposing lateral walls and a trench rear wall and by forming a cooling hole extending from the internal cavity to the trench rear wall. In one non-limiting example, the trench rear wall can be shaped to be tangential to an arc centered on a radius of an aft-most region of the internal cavity of the component.

In another example, the internal cavity can be made by a layup and infiltration process when the component is constructed with a composite material. As an alternative or when constructing the component with a process other than layup and infiltration, not all features need be formed by the same process or at similar stages of the manufacturing process. Features of the component including, for example, the trench, the cooling hole and the radius of the aft-most region of the internal cavity can be formed by a post-fabrication material removal process. Shaping the trench and forming the cooling hole can include laser drilling, ultrasonic machining, and other such processes.

The order in which the features of the component such as the trench, the cooling hole, and the radius of the internal cavity are formed can vary depending on, for example, dimensional and process parameters. It should be appreciated that forming the cooling hole can precede shaping the trench. Additionally, repeating the shaping and the forming steps can produce multiple cooling pathways. The trench can be shaped and the cooling hole can be formed to retard mixing of an external gas and a cooling fluid flowing from the internal cavity through the cooling hole and into the trench on the external surface of the component.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
    a shape operable as a gas turbine engine component;
    an internal cavity within the shape including a radius;
    a trench on an external surface of the shape including a rear face tangential to an arc centered on the radius of the internal cavity; and
    a cooling hole extending from the internal cavity and exiting to the trench through the rear face of the trench, wherein a cooling fluid introduced to the internal cavity flows through the cooling hole and into the trench during operation of the gas turbine engine component, the rear face extends to a point spaced a first distance from a suction sidewall defined by the external surface of the shape, the cooling hole is spaced a second distance from the suction sidewall greater than the first distance, and the rear face of the trench is centered on a centerline of the radius of the internal cavity.

2. The apparatus of claim 1, wherein the internal cavity is located proximate a trailing edge portion of the shape and wherein the radius is at an aft-most region relative to the trailing edge portion.

3. The apparatus of claim 2, wherein the trench is on the external surface of the shape proximate to the trailing edge portion of the shape.

4. The apparatus of claim 3, wherein the rear face tangential to the arc centered on the radius of the aft-most region of the internal cavity is planar and extends to lateral side walls of the trench and wherein the cooling hole exits the rear face internal to an outer periphery of the rear face relative to a pressure sidewall defined by the external surface of the shape.

5. The apparatus of claim 4, wherein the cooling hole has a variable geometry along a centerline of the radius of the internal cavity.

6. The apparatus of claim 1, wherein the trench includes an aft end located forward of an aft-most point of the shape.

7. The apparatus of claim 1, wherein the trench and the cooling hole have a geometry structured to retard mixing of external gases and the cooling fluid which flows through the cooling hole and into the trench.

8. The apparatus of claim 1, wherein the shape includes a composite structure.

9. The apparatus of claim 8, wherein the shape further includes an airfoil shaped gas path component.

10. An apparatus comprising:
a component having an airfoil shape with an external flow surface and a trailing edge portion, the component structured to be exposed to high temperature fluid flow;
an internal cavity for receiving cooling fluid disposed within the component, the internal cavity defined by an aft-most region adjacent the trailing edge portion that includes a surface having a radius of curvature;
at least one trench formed proximate an external portion of the trailing edge portion of the component, the at least one trench having a rear wall disposed at an angle to a pressure sidewall defined by the external flow surface, and opposing lateral walls extending downstream from the rear wall of the at least one trench; and
at least one cooling hole extending from the internal cavity through the rear wall of the at least one trench,
wherein the rear wall intersects one of the lateral walls at an interior-most point thereof spaced a first distance from the pressure sidewall, the cooling hole is spaced a second distance from the pressure sidewall less than the first distance, and the rear wall of the at least one trench is centered on a centerline of the radius of curvature.

11. The apparatus of claim 10, wherein at least a portion of the rear wall of the at least one trench is tangential to an arc centered on the radius of curvature of the aft-most region of the internal cavity.

12. The apparatus of claim 10, wherein the rear wall of the at least one trench is planar and extends to intersect both of the opposing lateral walls.

13. The apparatus of claim 10, wherein the at least one trench has at least one dimension structured to retard mixing of external gases and the cooling fluid flowing through the at least one cooling hole and the rear wall to the at least one trench on the external flow surface of the component.

14. The apparatus of claim 10, wherein the component is made of a ceramic composite material and is constructed to operate in a gas turbine engine.

15. A method comprising:
constructing a gas turbine engine component having an airfoil shape that includes a trailing edge and an internal cavity which is proximate the trailing edge;
shaping a trench on a pressure sidewall defined by an external surface proximate the trailing edge of the airfoil shape including a trench face tangential to an arc centered on a radius of an aft region of the internal cavity, wherein the trench face is centered on a centerline of the radius of the aft region of the internal cavity; and
forming a cooling hole extending from the internal cavity to the trench face that is spaced a first distance from the pressure sidewall, wherein the first distance is less than a second distance that at least a portion of the trench face is spaced from the pressure sidewall.

16. The method of claim 15, further comprising repeating said shaping the trench and said forming the cooling hole thereby creating a plurality of cooling pathways proximate to the trailing edge.

17. The method of claim 16, wherein said shaping the trench further includes shaping a planar trench face.

18. The method of claim 15, wherein said shaping the trench further includes structuring the trench to retard mixing of an external gas and a cooling fluid flowing from the internal cavity through the cooling hole to the trench on the external surface of the airfoil shape.

\* \* \* \* \*